(12) United States Patent
Mendis

(10) Patent No.: US 8,718,373 B2
(45) Date of Patent: May 6, 2014

(54) DETERMINING THE LOCATION AT WHICH A PHOTOGRAPH WAS CAPTURED

(71) Applicant: Charles Mendis, Mountain View, CA (US)

(72) Inventor: Charles Mendis, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/852,901

(22) Filed: Mar. 28, 2013

(65) Prior Publication Data

US 2013/0222616 A1    Aug. 29, 2013

Related U.S. Application Data

(63) Continuation of application No. 13/461,587, filed on May 1, 2012, now Pat. No. 8,417,000.

(60) Provisional application No. 61/569,549, filed on Dec. 12, 2011.

(51) Int. Cl.
*G06K 9/00* (2006.01)

(52) U.S. Cl.
CPC .................................. *G06K 9/00637* (2013.01)
USPC .......................................................... 382/181

(58) Field of Classification Search
CPC .................................................. G06K 9/00637
USPC .......................................................... 382/200
See application file for complete search history.

(56) References Cited

U.S. PATENT DOCUMENTS 7,847,729 B2    12/2010    Tysowski et al.
8,417,000 B1    4/2013    Mendis
2005/0151849 A1    7/2005    Fitzhugh et al.
2007/0297683 A1    12/2007    Luo et al.
2008/0154897 A1    6/2008    Meliha et al.

OTHER PUBLICATIONS

Sandnes, "Where was that photo taken? Deriving geographical information from image collections based on temporal exposure attributes", Multimedia Systems 2010.*
Chen et al., "Photo Time-Stamp Detection and Recognition," *In Proc. Seventh Int. Conf. on Document Analysis and Recognition* (2003).
Early Innovations, "GPSPhotoLinker Overview," (2004-2012). Retreived from the Internent on Apr. 19, 2011: URL:http://earlyinnovations.com/gpsphotolinker.
GeoSetter©, "Description," (2011). Retreived from the Internet on Jun. 26, 2012: URL:http://www.geosetter.de/en/.
GiSTEQ™, "PhotoTrackr™ Lite," (2010). Retreived from the Internet on Apr. 19, 2011: URL:http://www.gisteq.com/PhotoTrackr/PhotoTrackrDPL700.php.
Lin et al., "Joing People, Event, and Location Recognition in Personal Photo Collections Using Cross-Domain Context," ECCV (2010).
Toyama et al., "Geographic Location Tags on Digital Images," *In. Proc. Int. Conf. on Multimedia*, pp. 156-166 (2003).

\* cited by examiner

*Primary Examiner* — Anand Bhatnagar
*Assistant Examiner* — Soo Park
(74) *Attorney, Agent, or Firm* — Marshall, Gerstein & Borun LLP

(57) ABSTRACT

A method for geolocating photographs is implemented in a computing device. The method includes receiving a photograph captured by a user as data stored on a computer-readable medium, receiving location history data for the user, determining a time at which the photograph was captured based on an object depicted in the photograph, determining a geographic location at which the photograph was captured using the determined time and the location history data.

20 Claims, 7 Drawing Sheets

DETERMINING THE LOCATION AT WHICH A PHOTOGRAPH WAS CAPTURED

CROSS-REFERENCE TO RELATED APPLICATION

This application claims priority to U.S. patent application Ser. No. 13/461,587, filed on May 1, 2012, and titled "Determining the Location at which a Photograph was Captured," which claims priority to U.S. Provisional Patent Application No. 61/569,549, filed on Dec. 12, 2011, and titled "Determining the Location at Which a Photograph was Captured," the entire disclosures of each of which are hereby expressly incorporated by reference herein.

FIELD OF DISCLOSURE

This disclosure generally relates to techniques for processing photographs and, in particular, to determining and associating a geographic location with a photograph.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In many situations, users of digital and film cameras, camera phones, camcorders, and other image-capturing devices wish to know where a certain photograph was captured. Some digital cameras manufactured today are equipped with global position system (GPS) receivers that determine the location of the camera based on GPS satellite data. The user of a digital camera equipped with a GPS receiver may configure the GPS receiver to automatically compute the GPS coordinates of the location of the camera, whenever a photograph is captured with the camera, so that the camera can associate the photograph with the computed GPS coordinates. However, not all cameras are equipped with GPS receivers. Also, in some cases, a user may intentionally or inadvertently disable the GPS receiver of the camera. In other cases, the GPS data transmitted by the GPS satellites may be obscured from the GPS receiver of the camera if, for example, the camera is indoors. In each of these cases, a photograph captured with the camera will not be associated with the location information.

SUMMARY

In an embodiment, a method for geolocating photographs is implemented in a computing device. The method includes receiving a photograph captured by a user as data stored on a computer-readable medium, receiving location history data for the user, determining a time at which the photograph was captured based on an object depicted in the photograph, determining a geographic location at which the photograph was captured using the determined time and the location history data.

A method in another embodiment is for determining a location at which a photograph was captured using a camera. The photograph is stored as data on a computer-readable medium, and a location of the user at the time the photograph was captured corresponds to the location of the camera at the time the photograph was captured. The method is implemented in a computing device and includes detecting, in the photograph, an object that displays an indication of time as a plurality of alphanumeric characters. In response to determining that the plurality of alphanumeric characters matches a format of time indication, the method includes automatically determining a time at which the photograph was captured using the detected plurality of alphanumeric characters, automatically determining a location of the user at the determined time using user location data that is indicative of respective locations of the user at a plurality of instances of time during a time period including the determined time, and generating an electronic indication of the location at which a photograph was captured, such that the indication indicates the determined location of the user at the determined time.

In still another embodiment, a tangible computer-readable medium stores instructions for automatically determining a location at which a photograph was captured using a camera, where the photograph is stored as data on a computer-readable medium. When executed on a processor, the instructions cause the processor to determine a time at which the photograph was captured based on an objected depicted in the photograph. Further, the instructions cause the processor to receive user location data indicative of respective locations of a user at a plurality of instances of time during a time period, where the time period includes the determined time, and where a location of the user at the time the photograph was captured corresponds to the location of the camera at the time the photograph was captured. Still further, the instructions cause the processor to select, from the plurality of instances of time, a subset of instances of time most closely associated with the determined time, and determine the location at which the photograph was captured using the determined time and a subset of the user location data corresponding to the selected subset of instances of time.

DETAILED DESCRIPTION

Figure 1:
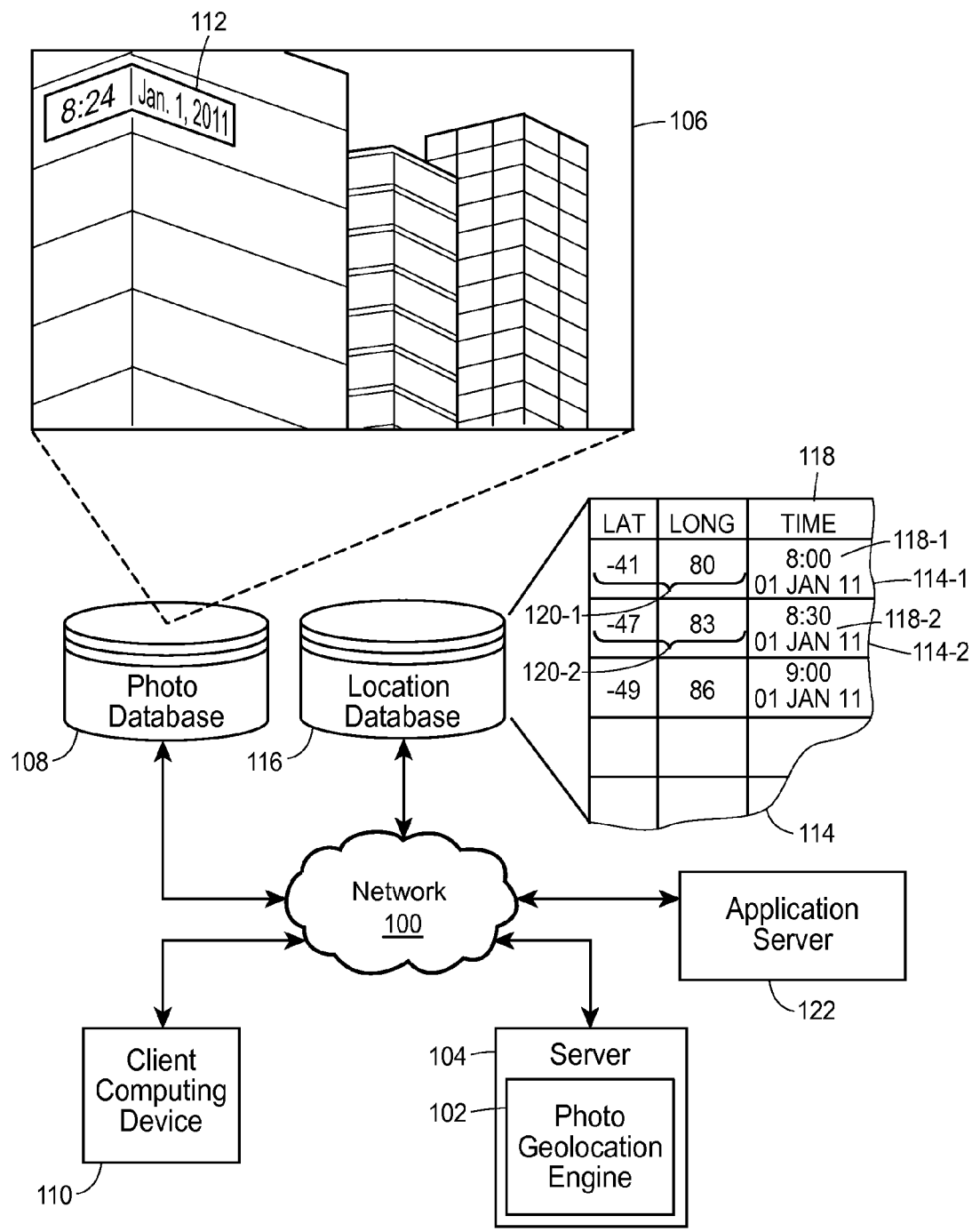
FIG. 1 is a block diagram of an example communication network in which a photo geolocation engine operates to determine the location at which a photograph was captured, according to an embodiment.

This specification describes a photograph location detection system (or simply "photo geolocation system") that automatically determines where a photograph was captured using one or several objects depicted in the photograph (or other visual attributes of the photograph) and, in some cases, additional information related to the location of a person who captured the photograph or is depicted in the photograph. Generally speaking, the photograph can depict objects or data directly or indirectly indicating the location at which the photograph was captured and/or the time of capture, from which the location then can be inferred. As used herein, the photograph may be a still photograph captured with a digital or analog camera, a video still extracted from a digital or analog video stream (e.g., an 8 mm tape, a VHS tape), etc. In various cases, the photograph may depict such objects as landmark structures, street signs, clocks and watches, electronic billboards, tickers, etc. In some scenarios, the photograph may depict people.

In an example scenario, the photo geolocation system identifies a landmark structure depicted in the photograph and obtains the location of the landmark structure to directly infer, extrapolate, interpolate, or otherwise determine the location at which the photograph was captured. As a more specific example, upon identifying a structure depicted in a photograph as a landmark structure, the photo geolocation system can retrieve the GPS coordinates of the landmark structure and associate the location at which the photograph was captured with the GPS coordinates of the landmark structure. The photo geolocation system also can associate the determined location with a certain margin of error, depending on the size of the landmark structure or other factors. Further, the photo geolocation system in some cases operates on photographs that depict faces of people known to be at certain locations at certain times, provided the operator of the photo geolocation system previously obtained consent from the relevant parties. According to other scenarios, the photo geolocation system recognizes and uses certain identifiable properties of objects depicted in the photographs, such as position of the sun or the moon relative to the horizon, for example. In yet other scenarios, the photo geolocation system operates on attributes of photographs such as, for example, a timestamp projected onto the film at the time the photograph was captured.

In some situations, the location at which a photograph was captured may be determined, at least approximately, based only on what is depicted in the photograph. In other situations, however, identifying an object in a photograph is insufficient for determining the location at which the photograph was captured. If the photograph depicts a clock that indicates the time of day, for example, the photograph cannot be geolocated based only on the indicated time. In such cases, the photo geolocation system may use additional information, such as a log that reflects the reported location of the user who took the photograph on the day the photograph was captured, which the user may provide to the photo geolocation system, or which the photo geolocation system may obtain from a suitable data repository with the user's permission. As discussed in more detail below, the photo geolocation system in these cases may correlate the time indicated in the photograph with one or several entries in the log to determine where the user likely took the photograph.

Generally speaking, the photo geolocation system may be used in annotating photo albums, labeling individual photographs or video recordings, or in any other application in which it is necessary or desirable to "tag" photographs with location data or, more generally, geolocate the photograph (i.e., associate the photograph with at least an approximate location at which the photograph was captured). Example techniques for associating photographs with the corresponding locations, which the photo geolocation system may implement, are discussed below with reference to FIGS. 1-7.

FIG. 1 illustrates an example computing environment in which a photo geolocation system 10 may be implemented. The photo geolocation system 10 includes a photo location detection engine (or simply "photo geolocation engine") 102, which may be implemented in a server 104 as a series of computer-executable instructions stored on a computer-readable medium such as a disk, for example. The location detection system 10 also may include a photograph database 108 to store photographs, which may come from any suitable manual or automated source. For example, users may upload individual pictures or photo albums to the photograph database 108 via desktop computers, handheld devices such as smartphones, various online services, etc. The photographs may be digital photographs captured using a digital camera or scans of film photographs. In general, photographs in the photograph database 108 may conform to any suitable digital format, including Joint Photographic Experts Group format (JPEG), Graphics Interchange Format (GIF), and Tagged Image File Format (TIFF). Further, in some embodiments, the photo geolocation system 10 includes, or co-operates with, a location database 116 that stores users' time-indexed location history. In an example implementation, user's time-indexed location history is made up of a series of records, each including GPS coordinates (latitude, longitude, and, in some cases, elevation) and a time indication.

A user may interact with the photo geolocation engine 102 via a client computing device 110. More particularly, the user may instruct the photo geolocation engine 102, via the client computing device 110, to identify the location where a photograph 106 was captured. In some implementations, the photo location system 10 requires that the user supply his or her logon credentials such as a user name, email address, password, etc. The user in general may refer to the photograph 106 individually or as a part of a group of photographs, e.g., a photo album. For example, the user may wish to obtain location data for a series of photographs the user captured at various places during a trip and uploaded to the photograph database 108.

In the example of FIG. 1, the photo geolocation engine 102 may detect an electronic ticker 112 in the photograph 106 that indicates time t. More specifically, the photo geolocation engine 102 may automatically recognize alphanumeric characters in the photograph 106, process the alphanumeric characters to obtain the character string displayed by the electronic billboard (in this case, "8:24 Jan. 1, 2011"), and automatically recognize that the character string may be an indication of time and date. As an even more specific example, the photo geolocation engine 102 may be configured to recognize a text pattern that includes a number between 0 and 24 followed by a colon and another number between 0 and 60 as an indication of time. A fully spelled-out name of a month or an abbreviated name of a month followed by a number between 0 and 31 may be recognized as an indication of a date. In general, the photo geolocation engine 102 may be configured to recognize any suitable format of time indication (or multiple such formats). The photo geolocation engine 102 may ask the user to confirm that the character string in fact includes a time and date, in some implementations. The photo geolocation engine 102 then may associate the time t with the time when the photograph 106 was captured by generating an appropriate data record to be stored in the photograph database 108, for example, or elsewhere on a computer-readable medium. In some cases, the photo geolocation engine 102 may utilize the detected time t only as a temporary variable and store the temporary variable in a transitory memory only (e.g., RAM).

It is noted that the electronic ticker 112 indicating the time t is depicted in the photograph 106 and, as such, is an integral component of the image captured in the photograph 106. By contrast, some photographs are associated with metadata, such as indications of time, authorship, etc., that may be stored along with the photograph or separately from the photograph, but in any case does not constitute an integral component of the image captured in the photograph. In the environment depicted in FIG. 1, the photograph database 108 may store metadata for some or all photographs. The photo geolocation system 10 in some cases may update or expand the metadata upon determining the time when a photograph was taken, the location at which the photograph was taken, or both.

In general, examples of objects indicating time similar to the electronic ticker 112 include digital clocks, analog clocks, screens or monitors displaying time and/or date, etc. In some instances, the photo geolocation engine 102 may include software modules to perform identification of objects indicating the time t. ABBYY FineReader 11, developed by ABBYY Software Ltd., is an example of a software module that may be included with the photo geolocation engine 102 to perform identification of objects indicating the time t. In other instances, the photo geolocation engine 102 may transmit a request to an application (collocated with the photo geolocation engine 102 at server 104 or disposed on the application server 122, for example) to perform identification of objects in the photograph indicating the time t. The photo geolocation engine 102 may include a reference to the photograph or a data file corresponding to the photograph with the request.

With continued reference to FIG. 1, the photo geolocation engine 102 may receive a time-indexed location history 114 for a certain user upon determining that the user has granted his or her permission thereto. As previously indicated, the photo geolocation system 10 may require that the user supply his or her login credentials, which the photo geolocation engine 102 may utilize to receive the user's time-indexed location history 114. The time-indexed location history of several users may be stored in the location database 116, which in some cases may be maintained independently of the photo location system 10. The time-indexed location history 114 for a user may include a series of records 114-1, 114-2, . . . 114-N. A record 114-1, for example, includes location information for the user in the form of latitude and longitude data. The record 114-1 also includes a time stamp 118-1. In essence, the record 114-1 indicates that the user was (at least) approximately at the location corresponding to latitude and longitude 120-1 at the time corresponding to time stamp 118-1.

The photo geolocation engine 102 may compare the time t, obtained from the depiction of the electronic ticker 112, to one or several time stamps 118 in the time-indexed location history 114. For example, the photo geolocation engine 102 may determine that the time t is temporally closest to the time stamp 118-2. The photo geolocation engine 102 accordingly may generate an index into the record 114-2 and associate the location where the photograph was captured (at least approximately) with the latitude/longitude 120-2. The photo geolocation engine 102 may generate a corresponding location indication (e.g., a string of alphanumeric characters) and, depending on the implementation or scenario, provide the location indication to the user via the corresponding client device, store the location indication in the record 114-2, store the location indication in a separate database, etc. As another alternative, the photo geolocation engine 102 may interleave the location indication into the digital record corresponding to the photograph 106 and store the updated digital record in a memory.

The time-indexed location history 114 may be discrete, e.g., include a series of data records corresponding to respective points in time. In some instances, the time t obtained from the photograph 106 does not directly correspond to any of the time entries 118-1, 118-2, . . . 118-N in the time-indexed location history 114 of the user. In such instances, the photo geolocation engine 102 may identify the two time entries 118-1 and 118-2 that define the boundaries of a time interval in which the time t lies. The photo geolocation engine 102 may interpolate the location information 120-1 and 120-2 that corresponds to the time entries 114-1 and 114-2 to approximate the latitude/longitude of the location where the photograph was captured.

In some scenarios, the photo geolocation engine 102 may utilize a map database (not shown) to determine a street/postal address corresponding to the latitude and longitude coordinates of the location where the photograph was captured. The photo geolocation engine 102 then may associate the photograph 106 with the determined street/postal address and, in some cases, update the appropriate fields of data structure storing metadata for the photograph 106. In some implementations, the photo geolocation system 10 also includes a database storing location information for landmark structures.

The photo database 108 and the location database 116 may be implemented in any suitable manner such as using relational database techniques, for example. Although in some implementations, the location database 116 is stored on one or several stationary devices (e.g., a server or server farm), the location database 116 also may be implemented in a portable device. For example, the user may utilize a GPS tracking device, such as Trackstick™ manufactured by Telespial Systems, Inc., to record his or her location at different times. The user may upload time-indexed location information stored in the GPS tracking device to the location database 116, or the GPS tracking device may operate as the database 116. As another example, the location database 116 may be associated with a service that maintains location data which users voluntarily submit at periodic intervals or at designated locations (by "checking in," for example), such as Foursquare, Gowalla, Google Latitude, etc.

In some scenarios, the location of the camera may be associated with the location of a smartphone or a laptop computer equipped with a wireless network card. For example, an application running on the user's smartphone may determine the location of the smartphone using GPS positioning, triangulation, or another suitable technique.

In an embodiment, the photo geolocation engine 102 may be available at an online application store disposed at the server 104 or the application server 122, for example. A user may retrieve a copy of the photo location engine 102 from the server 104 and "install" the retrieved copy of the photo location engine 102 on the client computing device 110. The client computing device 110 may be a tablet, desktop, netbook or laptop computer. Alternatively, the client computing device 110 may be a smartphone.

FIG. 2A-2E are examples of photographs on which the photo geolocation engine 102 may operate to determine the location where the photograph was captured. As discussed in more detail below, each of these photographs includes features which the photo geolocation engine 102 may recognize and utilize to determine the location where the photograph was captured and/or the time at which the photograph was captured.

Figure 2A:
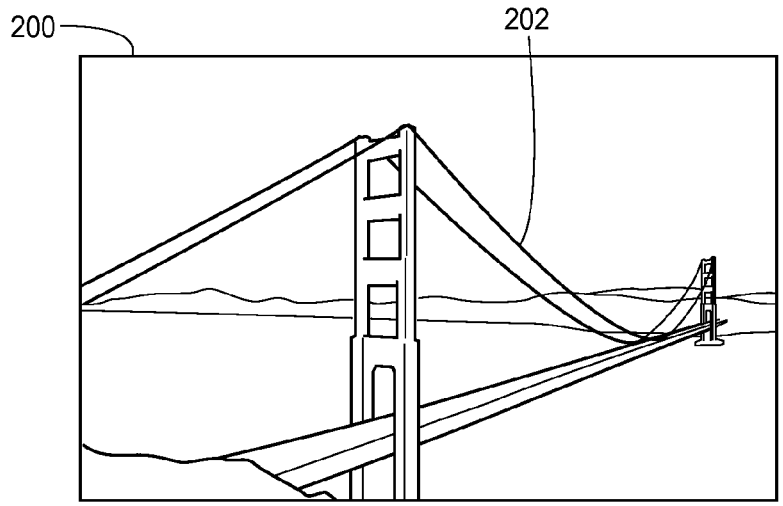
FIG. 2A is an example photograph on which an example photo geolocation engine of FIG. 1 operates to determine the location at which the photograph was captured using a landmark structure depicted in the photograph, according to an embodiment.

First referring to FIG. 2A, the photo geolocation engine 102 may identify a landmark structure 202 in a photograph 200. Generally speaking, landmark structures are readily recognizable. Identifying a landmark structure may include recognizing features or properties such as the outlines, shapes, color, etc. that characterize a particular landmark structure. The photo geolocation engine 102 may include, or cooperate with via appropriate application programming interfaces (APIs), landmark recognition software such as that utilized by such applications as Google Goggles, for example, to perform the automatic identification of landmark structures. The photo geolocation engine 102 may determine the name of a landmark structure and use the name of the landmark structure 202 to retrieve the location of the landmark structure 202 from a special-purpose landmark database (not shown) that includes a list of landmark structures and the corresponding location data. Alternatively, the photo geolocation engine 102 may use a web service such as that offered by Google or MapQuest, for example, and made accessible via the corresponding API. The landmark database may in some instances be a part of the location database 116. The photo geolocation engine 102 may associate the photograph 200 with location information for the identified landmark structure.

Alternatively, the photo geolocation engine 102 may transmit a request to an application to perform the identification of any landmark structures in the photograph 200. The request may be transmitted by invoking the requisite API function of the application. In this scenario, the photo geolocation engine 102 may provide the application with a reference or link to the photograph 200. The photo geolocation engine 102 may receive the location information of the identified landmark from the application. The photo geolocation engine 102 may associate the photograph 200 with the received location information of the identified landmark structure.

The location information received for the identified landmark structure may include the latitude/longitude coordinates of the landmark structure. Alternatively, the location information for the landmark structure may be received as a postal/street address. The photo geolocation engine 102 may associate the location of the landmark structure 202 with the photograph 200 and store an indication of the association in the photo database 108 of FIG. 1, for example. Of course, a photograph may include multiple landmark structures. In those cases where a photograph includes multiple landmark structures, the photo geolocation engine 102 may identify some or all the landmark structures in the photograph.

In some instances, the camera capturing a photograph may be a significant distance away from the identified landmark structure. In these instances, the photo geolocation engine 102 may be configured to associate the photograph with an indication corresponding to the general location of the camera, for example, town, city or county.

Figure 2B:
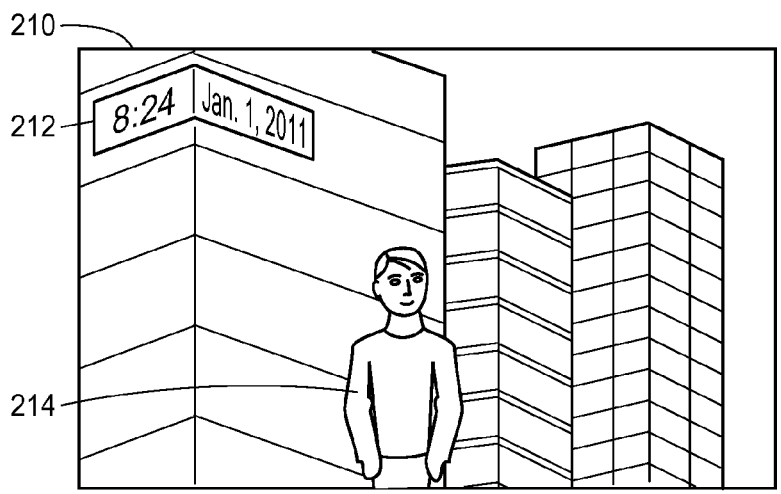
FIG. 2B is another example photograph on which an example photo geolocation engine of FIG. 1 operates to determine a location where the photograph was captured using a digital clock depicted in the photograph, according to an embodiment.

FIG. 2B is an example of another photograph 210 on which the photo geolocation engine 102 may operate to determine the location where the photograph 210 was captured. Similar to the photograph 106, the photo geolocation engine 102 may identify features such as an electronic ticker 212 indicating time t in the photograph 210. Further, the photo geolocation engine 210 may identify an individual 214 in the photograph 210, provided the proper consent has been obtained. To this end, the photo geolocation engine 102 may utilize face recognition software, such as that marketed by COGNITEC from Dresden, Germany. The photo geolocation engine 102 then may retrieve the time-indexed location information for the identified individual 214 from a location database, compare the time t identified in the photograph 210 to one or more timestamps in the time-indexed location information for the identified individual, and determine the location corresponding to the correlated timestamp in the time-indexed location information. For example, the time-indexed location information for the user depicted in the photograph 210 may indicate that at time $T_1$, the user was at location $L_1$. Upon determining that time t is sufficiently proximate to time $T_1$, the photo geolocation engine 102 may generate an indication that the photograph 210 is associated with the location $L_1$. In this embodiment, the photo geolocation engine 210 may associate the photograph with the time t.

In an example scenario, a user provides a set of representative photographs of herself, her family, and her friends to a photograph management and/or sharing service. The user then specifies names or other identifiers for each photograph (e.g., "Amy," "Bob"). For example, referring back to FIG. 1, the user can upload the set of representative photographs along with the corresponding names or identifiers to the photo database 108. Next, the user instructs the photo geolocation engine 102 to use the set of representative photographs when the photo geolocation engine 102 detects faces of people in photographs uploaded by the user. The user also provide the photo geolocation engine 102 access to her time-indexed location information. To enable the photo geolocation engine 102 to access the time-indexed location information of her family and friends, the user specifies email addresses of each person associated with the set of representative photographs, so that each relevant person can explicitly authorize the use of his or her the time-indexed location information for automatically geolocating photographs using the techniques of the present disclosure. Thus, the user may configure the photo geolocation engine 102 to operate on a specified set of people. More generally, some users may decide to share their time-indexed location information with each other to increase the probability of successfully geolocating a photograph.

Figure 2C:
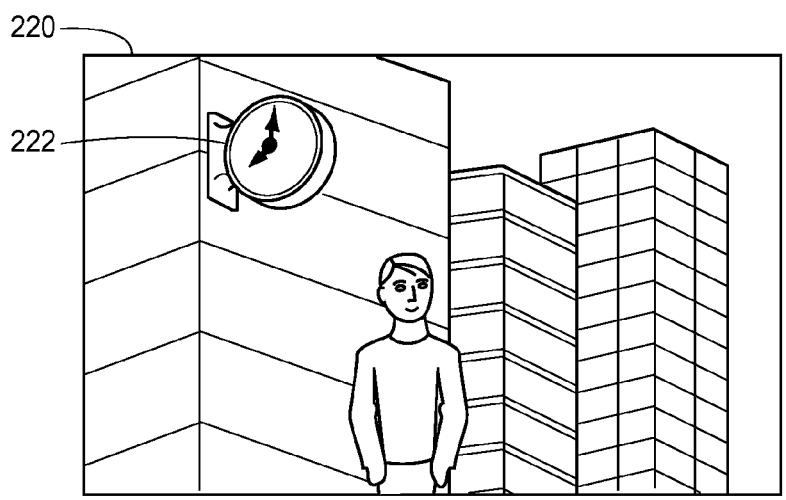
FIG. 2C yet another example photograph on which an example photo geolocation engine of FIG. 1 operates to determine a location where the photograph was captured using a clock depicted in the photograph, according to an embodiment.

FIG. 2C is another example of a photograph on which the photo geolocation engine 102 may operate. A photograph 220 is similar to the photograph 210 discussed above, except that the photograph 220 includes an analog clock 222. The photo geolocation engine 102 may identify the time depicted on the face of the analog clock 222 and associate the identified time with the time when the photograph 220 was captured. In this case, the photo geolocation engine 102 includes image recognition software modules adapted to perform the identification and conversion of the time depicted on the face of the analog clock 222 to a numeric representation. Similar to the example discussed above, when operating on the photograph 220, the photo geolocation engine 102 may identify the user depicted in the photograph 220, receive time-indexed location information for the identified user, identify a location in the time-indexed location information that has a timestamp most proximate to the time shown on the face of the analog clock 222, and associate the identified location with the photograph 220.

Figure 2D:
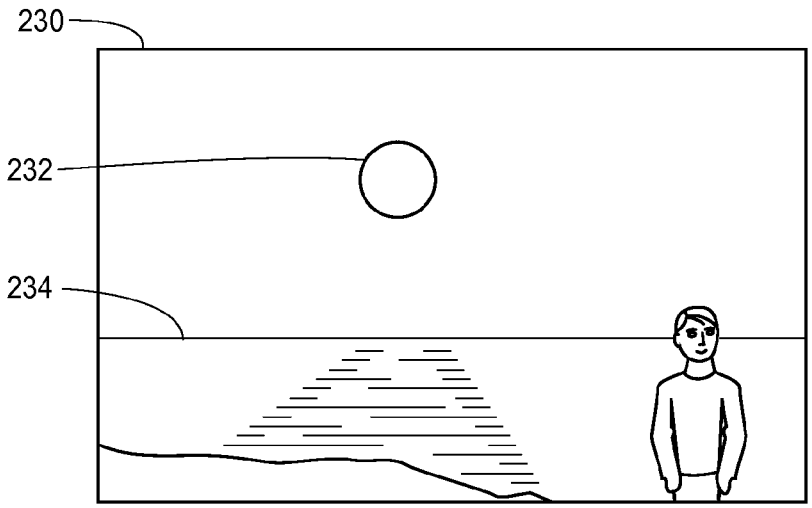
FIG. 2D is another example photograph on which an example photo geolocation engine of FIG. 1 operates to determine a location where the photograph was captured using the position of the sun depicted in the photograph, according to an embodiment.

FIG. 2D is still another example of a photograph 230 on which a photo geolocation engine 102 may operate to determine a location and a time indicating where and when, respectively, the photograph 230 was captured. In this case, the photo geolocation engine 102 may identify a celestial object 232, such as the sun, in the photograph 230. The photo geolocation engine 102 may also determine and utilize the location of the identified celestial object 232 relative to other features identified in the photograph, such as the horizon 234, to determine at least an approximate time when the photograph 230 was captured. The photo geolocation engine 102 may utilize visual attributes of the photograph 230, such as brightness, to determine a time when the photograph 230 was captured. As previously discussed, the photo geolocation engine 102 may utilize the time to identify a timestamp in a user's time-indexed location information that is temporally closest to the identified time. The photo geolocation engine 102 may utilize the timestamp to determine a location in the user's time-indexed location information that corresponds to the timestamp. The photo geolocation engine 102 may associate the location with the photograph 230.

Figure 2E:
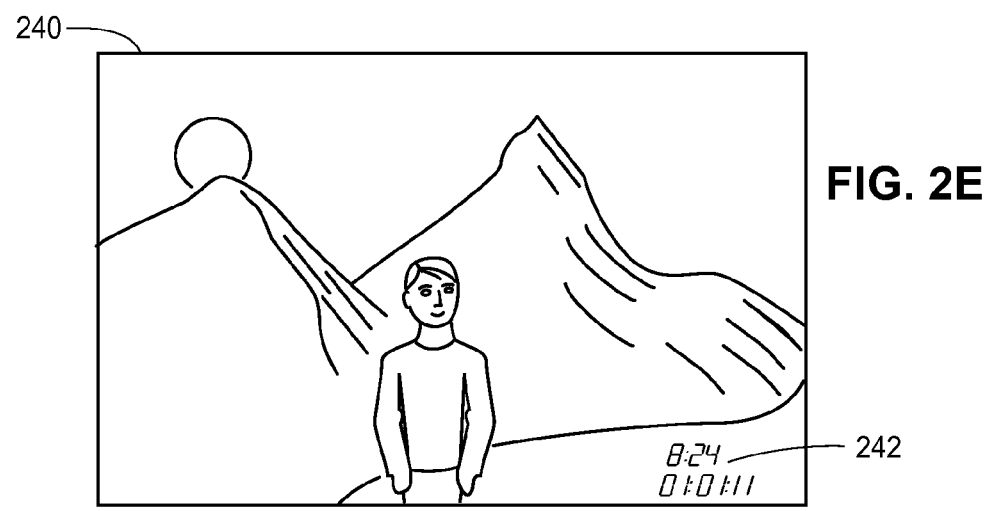
FIG. 2E is another example photograph on which an example photo geolocation engine of FIG. 1 operates to determine a location where the photograph was captured using a time stamp projected onto the photograph during capture, according to an embodiment.

FIG. 2E illustrates another example of a photograph on which a photo geolocation engine 102 may operate. In this example, the photo geolocation engine 102 may identify the time 242 that is interleaved with the captured image of a photograph 240. In those situations where the photograph 240 is captured using a film camera, the film camera may project the time onto the film when the camera shutter is actuated, causing the exposed film to include the projected time. In instances where the photograph 240 was captured with a digital camera, the digital camera may digitally interleave the time of capture with the photograph 240 by using suitable digital image processing techniques. More generally, alphanumeric characters indicative of time and/or date can be superimposed onto the image in any suitable manner. The photo geolocation engine 242 may perform optical character recognition (OCR) operations on the received photograph 240 to identify the time 242. The photo geolocation engine 102 may correlate the identified time 242 with a timestamp in a time-indexed location information for a user. The photo geolocation engine 102 may determine the location associated with the timestamp using the time-indexed location information of a user. The photo geolocation engine 102 may associate the location with the photograph 240 by generating an appropriate data structure, to be stored in a computer-readable memory, or a visual indication (e.g., a text box displayed via a user interface of a client device). In other embodiments, the photo geolocation engine 102 may update metadata fields associated with the photograph 240 with the identified time and/or location.

As previously discussed, the photo geolocation engine 102 may utilize a time identified in a photograph and a time-indexed location information for an individual identified in a photograph to determine a location where the photograph was captured. In some instances, however, the photo geolocation engine 102 may identify several other individuals in the photograph. In such cases, the photo geolocation engine 102 may associate the identified individuals with the time and location, provided consent of the relevant parties has been properly obtained.

Photographs may include images of two or more individuals. In some of these photographs, the user may be one of the individuals depicted in the photograph. Particularly, some of the individuals in the photograph may have authorized the sharing of their time-indexed location information with the user and the photo geolocation engine 102. In some cases, the time-indexed location information for the user may be unavailable for the time period corresponding to when the photograph was captured. In these cases, the photo geolocation engine 102 may utilize the time-indexed location information of one of the individuals identified in the photograph to determine the time when the photograph was captured. The photo geolocation engine 102 may also create a time-indexed location history for those individuals, including the user, identified in the photograph for whom a time-indexed location information is unavailable or is incomplete. A photograph illustrating this particular scenario is discussed next in some detail.

Figure 2F:
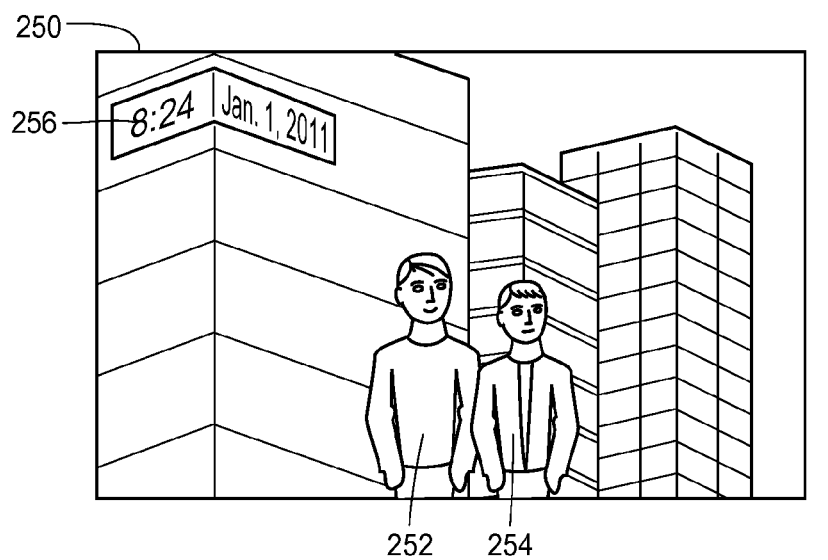
FIG. 2F is another example photograph on which an example photo geolocation engine of FIG. 1 operates to determine a location where the photograph was captured using the location information of a person depicted in the photograph, according to an embodiment.

The example photograph 250 illustrated in FIG. 2F includes a first individual 252 and a second individual 254, whom the photo geolocation engine 102 may automatically identify, provided proper permissions have been obtained. As discussed with reference to FIG. 2, the photo geolocation engine 102 may determine the identity of the two individuals 252 and 254 depicted in the photograph 250. In one scenario, the time-indexed location information may only be available for one of the individuals in the photograph, individual 252 for example. Upon determining the identity of the individual 252, the photo geolocation engine 102 may retrieve the time-based location history for individual 252. Alternatively, the photo geolocation engine 102 may query a remote database for the time-indexed location information for the individual 252. The remote database may be disposed at the location database 116 of FIG. 1, for example.

The photo geolocation engine 102 may identify the time the photograph 250 was captured by detecting and processing an electronic ticker 256 that indicates time t. As previously described, the photo geolocation engine 102 may correlate the identified time t with a timestamp from the time-indexed location information received for the first individual 252. The photo geolocation engine 102 may retrieve the location information (such as GPS coordinates) corresponding to the correlated time stamp and associate the photograph 250 with the time t identified in the photograph 256. The photo geolocation engine 102 may also associate the location information with the photograph 250.

The photo geolocation engine 102 may be configured to create a time-indexed location history for the individual 254 indentified in the photograph 250. The photo geolocation engine 102 may transmit an identifier of the individual 254, the time t identified in the photograph 256 and the location information associated with the photograph 250 to a remote locator service, for example. Alternatively or concomitantly, the photo geolocation engine 102 may create a time-indexed location information, similar to 114 depicted in FIG. 1, for the second identified individual 254.

In the examples discussed above, the photo geolocation engine 102 is described as performing the several intermediate steps of identifying the location where a photograph was captured and/or the location of a user. However, in some or all of the examples discussed above, the photo geolocation engine 102 may communicate with software applications, executing as separate processes or daemons on the same computing device as that on which the photo geolocation engine 102 is disposed or on a separate computing device, to perform the several intermediate steps of identifying a location where a photograph was captured. The software applications may be developed and distributed by third-party entities, in some cases. The photo geolocation engine 102 may transmit a request to a software application with a reference to the photograph to be processed. For example, the photo geolocation engine 102 may instruct a software application to perform an identification of features indicating a time in the photograph. More particularly, the photo geolocation engine 102 may instruct a second software application to perform the steps of correlating the time with a location from a user's time-indexed location history.

Similarly, the photo geolocation engine 102 may instruct a software application to identify individuals in the photograph. The photo geolocation engine 102 may also instruct a software application to determine a time when a photograph was captured based on the relative locations of celestial objects and geographic features and the brightness of captured photograph. In some implementations, the software applications discussed here may be located at the server 104. In other scenarios, the third-party software applications may be located on an application server 122. In these scenarios, the photo geolocation engine 102 may communicate with the third party software applications via the network 100.

Having considered several examples of photographs on which the photo geolocation system 10 may operate and several techniques that may be utilized to determine the location where photographs were captured, several methods that may be implemented in one or several devices operating in the photo geolocation system 10 are discussed next.

Figure 3:
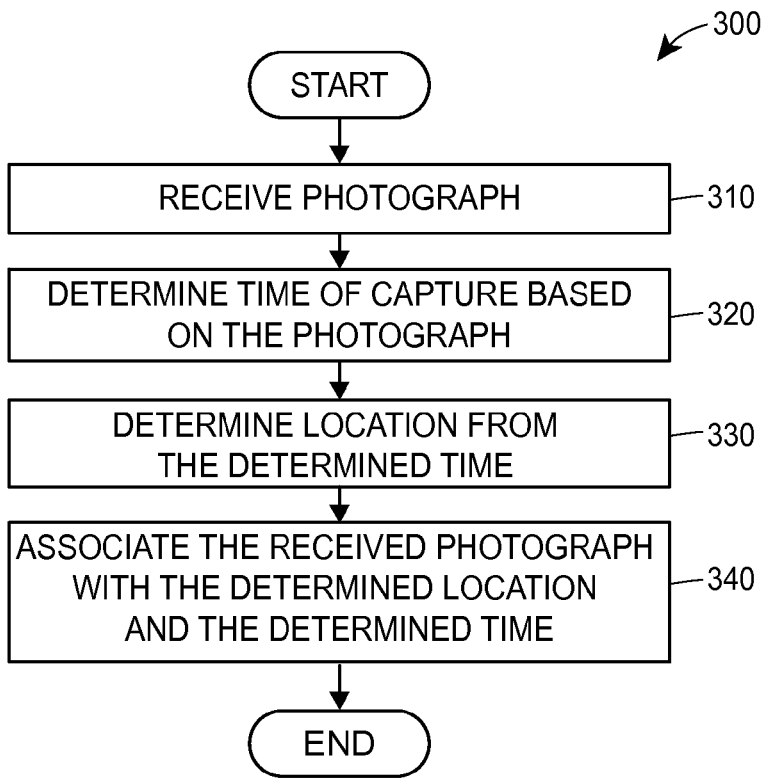
FIG. 3 is a flow diagram of an example method for associating a photograph with a location at which the photograph was captured that may be implemented in the system of FIG. 1.

FIG. 3 is a flow diagram of an example method 300 for associating a photograph with a location where the photograph was captured. The method 300 may be implemented in the photo geolocation engine 102, for example. At block 310, a photograph is received. The received photograph may include one or more of the several features discussed with reference to the photographs 106, 200, 210, 220, 230, 240, and 250. Depending on the scenario, the photograph may be received in the form of a digital file, a reference to a file stored elsewhere, etc.

At block 320, the time of capture of the photograph is determined. As discussed above, the time of capture may be based on a depiction of a clock in the photograph, a timestamp projected onto the photograph at the time of capture, etc. Next, a location corresponding at which the photograph was captured is determined at block 330. In an embodiment, a user's time-indexed location information is received or accessed to match the time determined at block 320 with a time at which the user's location was recorded.

At block 340, the location determined at block 330 is associated with the photograph received at block 310. For example, a data record including the determined location may be generated and provided to a user or stored in a database. In some cases, previously available metadata associated with the photograph is updated with the location determined at block 330.

Figure 4:
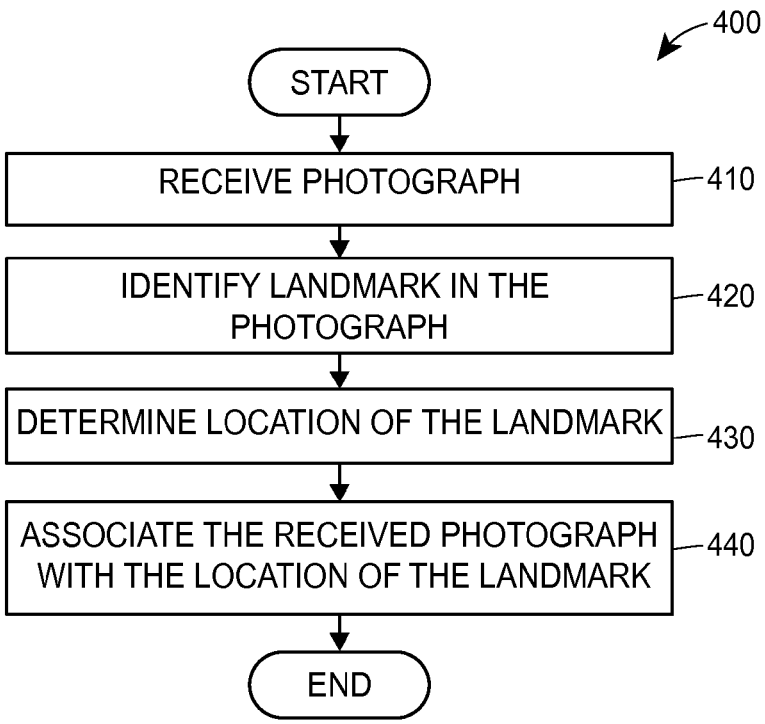
FIG. 4 is a flow diagram of another example method for associating a photograph with a location at which the photograph was captured that may be implemented in the system of FIG. 1.

FIG. 4 is a flow diagram of an example method 400 that may be implemented in a photo geolocation engine 102 or a similar component to determine the location where a photograph was captured. At block 410, a photograph that depicts one or more landmark structures is received. Alternatively, the method implemented at block 410 may, for example, receive a reference to a photograph stored in the photo database 108 of FIG. 1. In this case, the method implemented at block 410 may retrieve the photograph from the photo database 108. A landmark structure may be identified in the photograph at block 420. The identification of the landmark structure may be performed by the photo geolocation engine 102. In another embodiment, at block 420, a software application executing at the application server 122 of FIG. 1 may be instructed to identify any landmark structures in the received photograph. In this embodiment, at block 420, a reference to any landmark structures identified in the photograph by the software application may be received. At block 430, a location for the landmark structure identified at block 420 may be determined. For example, the location database 116 of FIG. 1 may be queried to determine the location of the identified landmark structure. In another embodiment, a request to determine the location of the identified landmark structure is transmitted to a remote software application or service, and the location of the identified landmark structure determined by the remote software application or service is received at block 430. The location of the identified landmark structure may be associated with the photograph at block 440.

Figure 5:
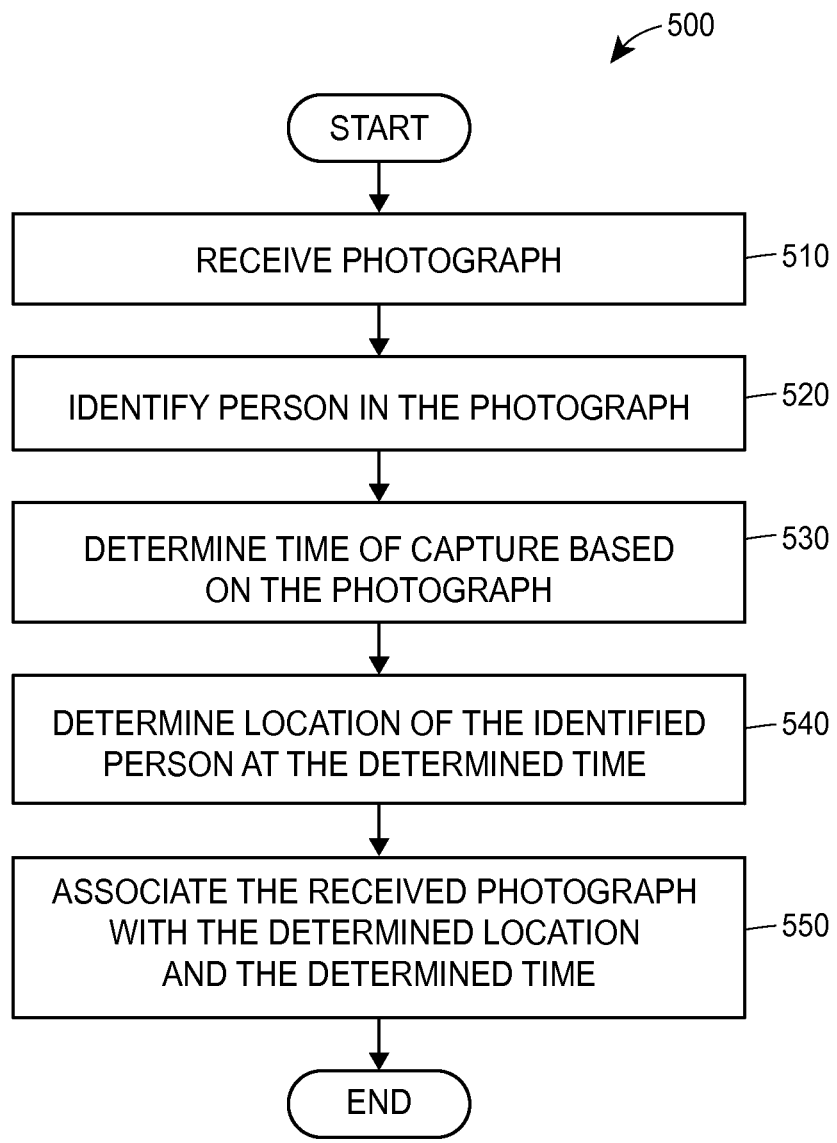
FIG. 5 is a flow diagram of yet another example method for associating a photograph with a location where the photograph was captured.

FIG. 5 is a flow diagram for an example method 500 for associating a photograph with a location based on identifying an individual in the photograph and a time of capture determined from the photograph. The example method 500 may be implemented in a photo geolocation engine 102, in an embodiment. At block 510, a photograph is received. A person is recognized in the photograph at block 520. In an embodiment, facial recognition algorithms may be implemented at block 520. In another embodiment, the method 500 at block 520 instructs a software application to perform the identification of persons in the photograph. Referring back to FIG. 1, in one implementation, the software application may be located at the application server 122. In this case, the method implemented at block 520 may transmit a request to the application server 122 via the network 100. The request may include the photograph received at block 510 and/or a reference to where the photograph is located.

At block 530, a time of capture of the photograph is determined using techniques generally similar to those discussed above. Next, at block 540, the location of the person at the time obtained at block 530 may be determined or estimated. The photograph then may be associated with the determined location (block 550).

Figure 6:
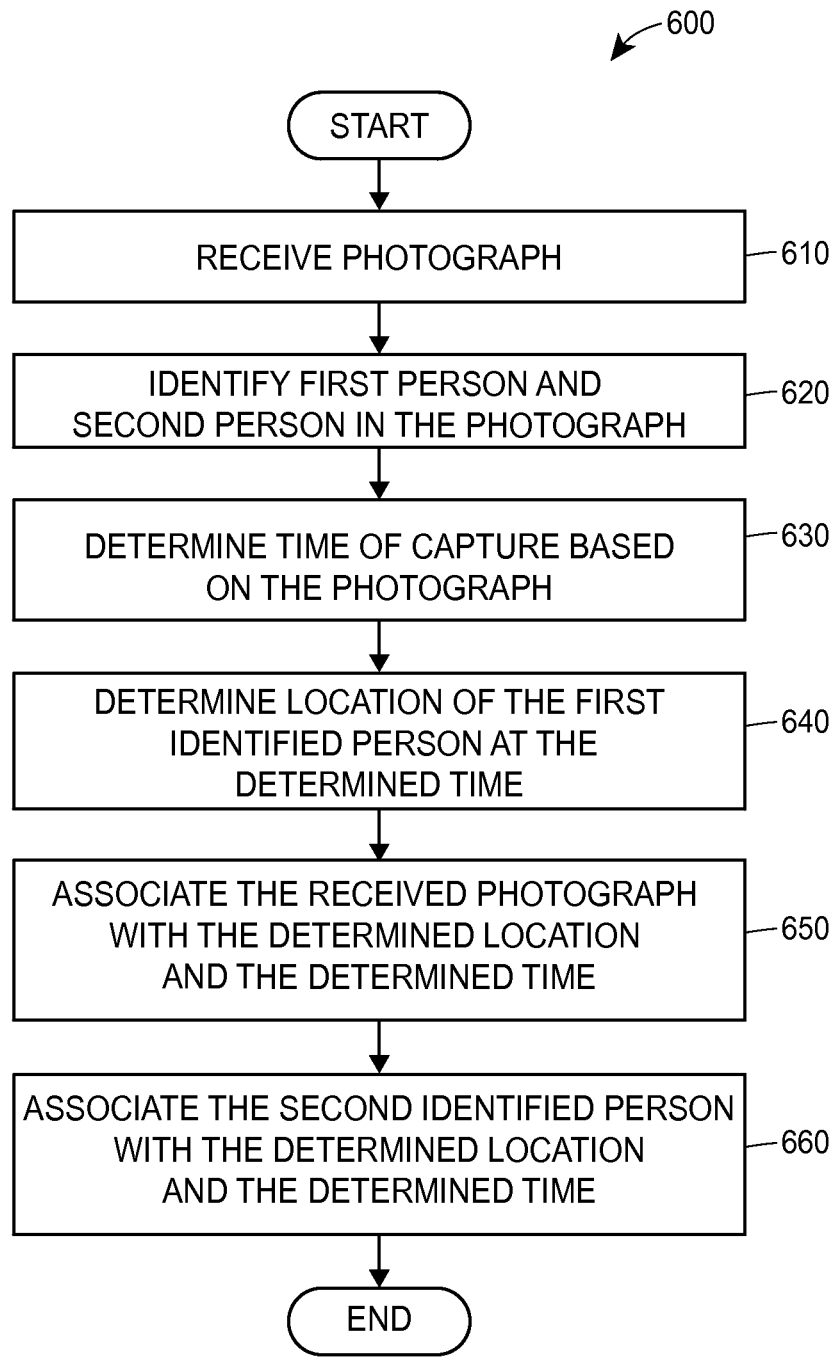
FIG. 6 is a flow diagram of still another example method for associating a photograph with a location where the photograph was captured.

FIG. 6 is a flow diagram of another example method that may be implemented in a photo geolocation engine 102 or a similar module. A photograph is received at block 610 and, at block 620, a first person and a second person are identified in the received photograph. In one case, the method implemented at block 620 may transmit a request to a application to the perform the identification of the first person and/or the second person. In this case, an indication of the identities of the first person and the second person may be received at block 620. The indication may include an identifier, such as an email or a token, corresponding to the identities of each person. At block 630, a time of capture of the photograph may be determined. The method 600 at this time may identify features in the photograph that indicate a time of capture.

The method 600 then may utilize the first person's time-indexed location information to determine a location of the first person at the time of capture of the photograph (block 640). In another scenario, a locator service operated by a separate entity, Google Latitude, for example, may be queried by invoking API functions of the locator service, to determine the first person's location at a time corresponding to the time of capture of the photograph determined at block 630. At block 650, the photograph is associated with the first person's location. Creating the association may include updating the metadata fields of the photograph with the location information. Alternatively, a data record in a database may be updated with a reference to the photograph and the location information.

At block 660, the second person identified in the photograph may be associated with the time of capture of the photograph. The method implement at block 660 may create a time-indexed location history for the second person.

Next, by way of example, several components of an example photo geolocation engine are discussed with reference to FIG. 7. The photo geolocation engine of FIG. 7 may operate in any suitable environment, such as the photo geolocation system 10 illustrated in FIG. 1. More particularly, in an example embodiment, the photo geolocation engine 102 is similar or identical to the photo geolocation engine of FIG. 7.

Figure 7:
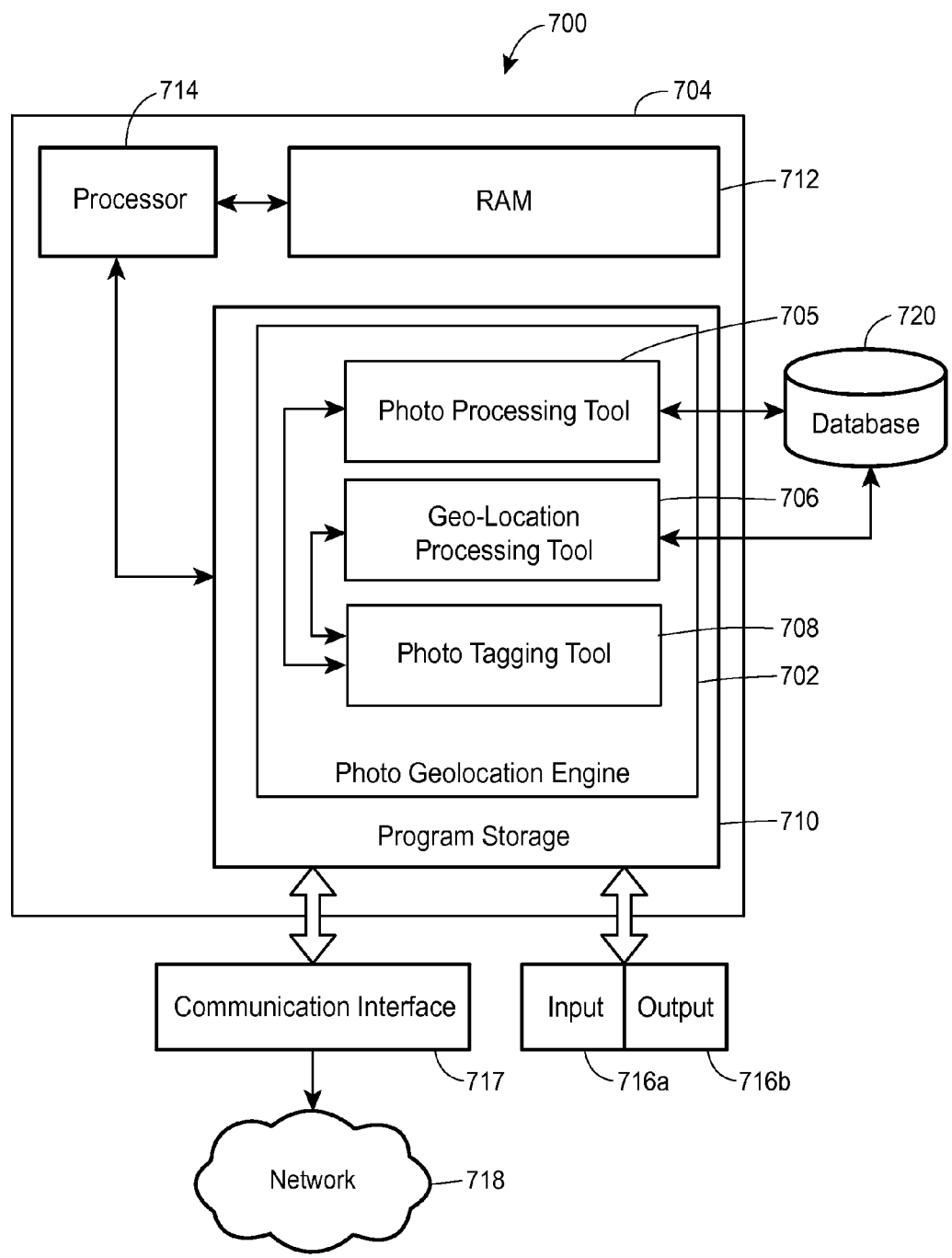
FIG. 7 is an example of a block diagram of a computing device in which an example photo geolocation engine may operate.

FIG. 7 is a block diagram of a computing device 700 in which a photo geolocation engine 702 may be implemented to automatically determine the location where a photograph was captured. The photo geolocation engine 702 may operate on photographs similar to the previously discussed photographs 106, 200, 210, 220, 230, 240, and 250. In the embodiment of FIG. 7, the photo geolocation engine 702 operates in a computing device 704 and includes a photo processing tool 705, a geolocation processing tool 706, and a photo tagging tool 708 stored as computer-readable instructions on a storage medium (or "program storage") 710 that may be tangible and non-transitory. The computing device 704 includes random access memory 704 and a processor 714 which executes the software instructions of the photo geolocation engine 702. In some implementations, a computing device 714 may include a multi-core processor. The photo tagging tool 708 may be communicatively coupled to the geolocation processing tool 706 and the photo processing tool 705.

The photo geolocation engine 702 may receive input from an input sub-system 716a which is communicatively coupled to the computing device 704. The input sub-system 716a generally may include one or more of a pointing device such as a mouse, a keyboard, a touch screen, a trackball device, a digitizing tablet, etc. The photo geolocation engine 702 provides output to a user via the output sub-system 716b. The output 716b may include a video monitor, a liquid crystal display (LCD) screen, etc. The photo geolocation engine 702 may also be communicatively coupled to a communication interface 717. The communication interface 717 generally may include a wired ethernet communication link, a wireless ethernet communication link, etc. The photo geolocation engine 702 may communicate with remote hosts (not shown) disposed on a network 718 via the communication interface 717.

In operation, the photo tagging tool 708 may receive a request from a user to determine the location where a photograph was captured. The photograph may be stored in the database 720. The photo geolocation engine 702 may provide the user with a user interface via the output sub-system 716b to enable the user to select a photograph from the database 720. The photograph may include several of the previously discussed identifiable features that may allow the photo geolocation engine 702 to determine the location where the photograph was captured. The photo tagging tool 708 may instruct the photo processing tool 705 to process the photograph. The photo processing tool 705 may process the photograph to identify one or more of the previously discussed identifiable feature such as a landmark structure, a feature indicating a time when the photograph was captured, the identity of several individuals in the photograph, etc.

The photo tagging tool 708 may receive an indication corresponding to one or several of the features identified in the photograph from the photo processing tool 705, which may instruct the geolocation processing tool 706 to determine the location where a photograph was captured. In one instance, the geolocation processing tool 706 may receive from the photo processing tool 705 an indication of a time when a photograph was captured. The geolocation processing tool 706 may utilize the time to determine a user's location at that time. As previously discussed, the geolocation processing tool 706 may utilize the user's time-indexed location information to determine the user's location at the time identified in the photograph. In other instances, the geolocation processing tool 706 may also receive an indication corresponding to the identity of an individual identified in a photograph. In this instance, the geolocation processing tool 706 may identify the time-indexed location information for the identified individual. The geolocation processing tool 706 may correlate the received time indication with a time from the identified individual's time-indexed location information to determine the individual's location at the identified time. The geolocation processing tool 706 may also operate to determine the location information for landmark structures identified in the photograph. In each instance, the geolocation processing tool 706 may transmit an indication of a location corresponding to the location where the photograph was captured. The photo tagging tool 705 may receive the indication of the location and associate the photograph with the indication. In some embodiments, the photo tagging tool 705 may save the indication of the association in the database 720. The photo geolocation engine 702 may display the location where the photograph was captured on a map via the output 716b.

In some implementations, the photo processing tool 705 and the geo-location processing tool 706 may be disposed on different devices interconnected via the network 718. Referring back to FIG. 1, for example, the photo processing tool 705 and the geo-location processing tool 706 may be disposed on the application server 122. In these scenarios, the photo tagging tool 708 may communicate with the photo processing tool 705 via the communication interface 717. The photo tagging tool 708 may instruct the photo processing tool 705 to perform the identification of the previously discussed identifiable features in the photograph. The photo tagging tool 708 may receive one or several features identified in the photograph from the photo processing tool 705. Further, the photo tagging tool 705 may instruct the geolocation processing tool 706 via the communication interface to determine the location where a photograph was captured. The instruction may include a reference to a time that was identified in photograph. Also, the instruction may include a reference to the identity of an individual identified in the photograph.

In some cases, the computing device 700 may be a tablet computer or a smart phone. For example, the computing device 700 may be an APPLE IOS, ANDROID OS, or WEBOS based computing device. To reduce the burden imposed on the processor 714 or to reduce the memory footprint of the photo geolocation engine 702, the photo tagging tool 708 may be generated to operate as a standalone application within the computing environment of the computing device 700, in some implementations. In these implementations, the photo tagging tool 708 may communicate with the database 720, the photo processing tool 705 and the geolocation processing tool 706 via a cellular communication channel or a Wi-Fi communication channel established through the communication interface 717, for example, As previously discussed, the database 720, the photo processing tool 705 and the geo-location processing tool 706 may be disposed at a remote server connected to the network 718.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter discussed in this disclosure.

Certain embodiments are described in this disclosure as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described in this disclosure.

Unless specifically stated otherwise, discussions in this disclosure that use words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in this disclosure, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used in this disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments discussed in this disclosure. This is done merely for convenience and to give a general sense of the invention. This description should be read to include one or at least one and the singular also includes the plural unless it is apparent that it is meant otherwise.

Upon reading this disclosure, those of ordinary skill in the art will appreciate still additional alternative structural and functional designs for a system and a process for determining the location at which an image was captured through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed in this document without departing from the spirit and scope defined in the appended claims.

What is claimed:

1. A method in a computing device for geolocating photographs, the method comprising:
    receiving, by one or more processors, a photograph captured by a user as data stored on a computer-readable medium;
    receiving, by the one or more processors, location history data for the user;
    automatically determining, by the one or more processors, a time at which the photograph was captured based on a real-world physical object captured in the photograph; and
    determining, by the one or more processors, a geographic location at which the photograph was captured using the determined time and the location history data.

2. The method of claim 1, wherein the object captured in the photograph displays an indication of current time.

3. The method of claim 2, wherein the object is a digital clock, and wherein determining the time at which the photograph was captured includes processing, by the one or more processors, a plurality of alphanumeric characters.

4. The method of claim 3, wherein processing the plurality of alphanumeric characters includes:
    comparing, by the one or more processors, the plurality of alphanumeric characters to a predetermined format of time indication, and
    in response to determining that the plurality of alphanumeric characters matches the predetermined format of time indication, interpreting, by the one or more processors, the recognized plurality of alphanumeric characters as the indication of the time at which the photograph was captured.

5. The method of claim 2, wherein the object is a billboard.

6. The method of claim 1, wherein the photograph is stored in an online repository of the user's photographs.

7. The method of claim 1, wherein the location history data specifies a plurality of instances of time and respective geographic locations, and wherein determining the geographic location includes:
    selecting, from among the plurality of instances of time in the location history data, an instance of time closest to the time at which the photograph was captured, by the one or more processors, and
    automatically associating, by the one or more processors, the geographic location at which the photograph was captured with the geographic location corresponding to the selected instance of time.

8. The method of claim 1, wherein receiving the photograph captured by the user includes:
    receiving the photograph by the one or more processors, and
    applying, by the one or more processors, a facial recognition technique to the photograph to identify the user.

9. A method in a computing device for determining a location at which a photograph was captured using a camera, wherein the photograph is stored as data on a computer-readable medium, and wherein a location of the user at the time the photograph was captured corresponds to the location of the camera at the time the photograph was captured; the method comprising:

detecting, by one or more processors, a real-world physical object captured in the photograph, wherein the object displays an indication of time as a plurality of alphanumeric characters;

in response to determining that the plurality of alphanumeric characters matches a format of time indication, automatically determining, by the one or more processors, a time at which the photograph was captured using the detected plurality of alphanumeric characters;

automatically determining, by the one or more processors, a location of the user at the determined time using user location data that is indicative of respective locations of the user at a plurality of instances of time during a time period including the determined time; and generating, by the one or more processors, an electronic indication of the location at which a photograph was captured, wherein the indication indicates the determined location of the user at the determined time.

10. The method of claim 9, wherein determining the time includes recognizing numerals of a digital clock captured in the photograph.

11. The method of claim 9, wherein automatically determining the location of the user at the determined time includes electronically receiving the location data including a plurality of data records, wherein each of the plurality of data records indicates a respective time and a respective location of the user at the indicated time; the method further comprising:

selecting, from the plurality of data records, a data record indicating a time closest to the determined time, by the one or more processors, wherein the determined of the user corresponds to a location which the selected data record indicates.

12. The method of claim 9, wherein the photograph is stored in an online repository of the user's photographs.

13. The method of claim 9, further comprising:

receiving the photograph by the one or more processors, and applying, by the one or more processors, a facial recognition technique to the photograph to identify the user.

14. A non-transitory computer-readable medium storing instructions thereon for automatically determining a location at which a photograph was captured using a camera, wherein the photograph is stored as data on a computer-readable medium; wherein the instructions, when executed on a processor, cause the processor to:

determine a time at which the photograph was captured based on a real-world physical object captured in the photograph, receive user location data indicative of respective locations of a user at a plurality of instances of time during a time period, wherein the time period includes the determined time, and wherein a location of the user at the time the photograph was captured corresponds to the location of the camera at the time the photograph was captured;

select, from the plurality of instances of time, a subset of instances of time most closely associated with the determined time; and determine the location at which the photograph was captured using the determined time and a subset of the user location data corresponding to the selected subset of instances of time.

15. The computer-readable medium of claim 14, wherein the object captured in the photograph is a digital clock displaying current time.

16. The computer-readable medium of claim 14, wherein the object captured in the photograph is an electronic billboard displaying current time.

17. The computer-readable medium of claim 14, wherein the object captured in the photograph is an analog clock displaying current time.

18. The computer-readable medium of claim 14, wherein the photograph depicts the user; wherein:

the instructions further cause the processor to apply a facial recognition function to automatically identify the user, and the instructions cause the processor to receive the user location data is in response to identifying the user.

19. The computer-readable medium of claim 14, wherein to determine the time at which the photograph was captured, the instructions further cause the processor to recognize a plurality of alphanumeric characters.

20. The computer-readable medium of claim 19, wherein to determine the time at which the photograph was captured, the instructions further cause the processor to compare the recognized alphanumeric characters to a predefined format of time indication.

* * * * *